United States Patent
Roach

(10) Patent No.: US 7,476,340 B2
(45) Date of Patent: Jan. 13, 2009

(54) COMPOSITION CONTAINING ALLOYED NANOPHENE MOIETIES

(75) Inventor: David Herbert Roach, Hockessin, DE (US)

(73) Assignee: E. I. Du Pont De Nemours & Company, Wilmington, DE (US)

( * ) Notice: Subject to any disclaimer, the term of this patent is extended or adjusted under 35 U.S.C. 154(b) by 223 days.

(21) Appl. No.: 11/610,310

(22) Filed: Dec. 13, 2006

(65) Prior Publication Data

US 2008/0185560 A1    Aug. 7, 2008

(51) Int. Cl.
*H01B 1/04* (2006.01)
(52) U.S. Cl. .................... 252/503; 423/445 B
(58) Field of Classification Search ............ 252/503; 423/445 B
See application file for complete search history.

(56) References Cited

U.S. PATENT DOCUMENTS

| 5,997,832 A | * | 12/1999 | Lieber et al. ............ 423/249 |
| 6,043,243 A | | 3/2000 | Nishino et al. |
| 6,063,243 A | | 5/2000 | Zettl et al. |
| 6,231,980 B1 | | 5/2001 | Cohen et al. |
| 2005/0116602 A1 | * | 6/2005 | Iijima et al. ............ 313/311 |

FOREIGN PATENT DOCUMENTS

JP    06166509    * 6/1994

OTHER PUBLICATIONS

Chen et al "The Characterization of boron-doped carbon nanotube arrays", Diamond and Related Materials 12(2003) 1500-1504.*
Weng-Sieh et. al., Synthesis B C N Nanotubules, Phys. Rev. B, 1995, vol. 51:11229-11232.

* cited by examiner

*Primary Examiner*—Mark Kopec
(74) *Attorney, Agent, or Firm*—Gail Tanzer

(57) ABSTRACT

Alloyed nanophenes comprising carbon, boron, and a Group V element other than nitrogen are provided. The alloyed nanophenes are useful, for example, as miniature electronic components, such as wires, coils, schottky barriers, diodes, inductors, memory elements, and other circuit devices and elements.

4 Claims, No Drawings

COMPOSITION CONTAINING ALLOYED NANOPHENE MOIETIES

FIELD OF THE INVENTION

The invention relates to alloyed nanophenes, more particularly to alloyed nanophenes comprising carbon, boron, and a Group V element other than nitrogen.

BACKGROUND OF THE INVENTION

Nanophenes have one or more single layer arrays or networks of a predominant atom, typically carbon, although up to 50 percent of the predominant atom can be substituted by one or more other atoms. Nanophenes can also be functionalized or otherwise reacted to other chemical species. Representative nanophenes include nanotubes; nanohorns (nanotubes having one closed end); fullerenes, for example, $C_{60}$ fullerenes, $C_{70}$ fullerenes, $C_{76/78}$ fullerenes, or $C_{84}$ fullerenes; and the like.

The nanophene layer (or for multi-walled nanophenes, each layer) will tend to curl or otherwise orient in a spherical, tubular, or cornucopia type pattern. In considering a nanophene structure, two axes or directions are noteworthy: (i) the traverse or "y" direction perpendicular to the layer(s); and (ii) the axial or "x" direction parallel to the layer(s) (and perpendicular to the y direction). Nanophenes have an average length in the y direction of less than 100 nanometers. The x direction length of a nanophene can be virtually any length, at least theoretically, but typically is less than a millimeter.

U.S. Pat. No. 6,231,980 discloses nanotubes and nanoparticles having stoichiometries of $B_xC_yN_z$, where x, y, and z are integers including zero where no more than one of x, y, and z are zero for a given stoichiometry.

SUMMARY OF THE INVENTION

One aspect of this invention is an alloyed nanophene having a stoichiometry of $C_{1-x}Z_xB_y$; wherein Z is selected from phosphorus, arsenic, and antimony; and further wherein $0.05<x<0.2$ and $0<y<0.2$.

In another aspect of the invention, the inventive alloyed nanophenes can further comprise dopant material. Preferably, the dopant material is selected from carbon, nitrogen, aluminum, silicon, phosphorus, beryllium, oxygen, lithium, sodium, potassium, rubidium, cesium, francium, osmium tetroxide and mixtures thereof. The inventive alloyed nanophene can also be substituted with, for example, methyl or butyl groups.

DETAILED DESCRIPTION

Applicants specifically incorporate herein by reference in their entirety all documents cited in this disclosure. Applicants also incorporate by reference the co-owned and concurrently filed application entitled "Alloyed Nanophenes" U.S. Ser. No. 11/610,305.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The term "alloyed nanophene" as used herein means a composition comprising one or more single layer arrays or networks of a predominant atom, typically carbon, although up to 50 percent of the dominant atom can be substituted with one or more other atoms. Nanophenes can also be functionalized or otherwise reacted to other chemical species. Representative nanophenes include nanotubes; nanohorns; and fullerenes such as, for example, $C_{60}$ fullerenes, $C_{70}$ fullerenes, $C_{76/78}$ fullerenes, or $C_{84}$ fullerenes; and the like.

Nanotubes can be single-walled nanotubes (SWNT) or multi-walled nanotubes (MWNT). Nanohorns can be single-walled nanohorns or multi-walled nanohorns.

One aspect of the invention is alloyed nanophenes comprising carbon, nitrogen, and a group V element other than nitrogen. Inventive alloyed nanophenes having crystalline walls can be formulated to comprise a variety of stoichiometries of $C_{1-x}Z_xB_y$; wherein Z is selected from one or more of phosphorus, arsenic, and antimony; and further wherein $0.05<x<0.2$ and $0<y<0.2$.

Synthesis of the inventive alloyed nanophenes can be carried out in accordance with methods and instruments known to those skilled in the art, such as those disclosed, for example, in U.S. Pat. No. 6,063,243, U.S. Pat. No. 6,231,980, and Weng-Sieh et al., Phys. Rev. B 51:11229-32 (1995). A number of different electrode types, arc currents, and gas pressure configurations can produce favorable results. For example, one can insert a rod of aluminum nitride (or GaN or InN) into a carbon rod to serve as the anode in an arc process, as otherwise described in U.S. Pat. No. 6,043,243.

The inventive alloyed nanophenes can be doped with added elements and/or molecules to alter the electronic properties of the alloyed nanophenes. Non-limiting examples of doping elements include carbon, nitrogen, aluminum, silicon, phosphorus, beryllium, oxygen, lithium, sodium, potassium, rubidium, cesium, and francium. A non-limiting example of doping molecule is osmium tetroxide. Mixtures of elements, mixtures of molecules, and mixtures of elements and molecules are also contemplated as dopant materials. Typically, the concentration of dopant is less than 1%. The nanophene can also be substituted with methyl or butyl groups.

The alloyed nanophenes are useful as miniature electronic components, such as wires, coils, schottky barriers, diodes, inductors, memory elements, and other circuit devices and elements. The alloyed nanophenes can also be used as a coating to protect an item from detection by electromagnetic monitoring techniques like radar. The alloyed nanophenes are additionally useful for their mechanical properties, being comparable in strength and stiffness to the best graphite fibers or carbon nanotubes. The inventive alloyed nanophenes are useful in lubricants and composites.

I claim:

1. An alloyed nanophene having a stoichiometry of $C_{1-x}Z_xB_y$; wherein Z is selected from phosphorus, arsenic, and antimony; and further wherein $0.05<x<0.2$ and $0<y<0.2$.

2. The alloyed nanophene of claim 1, wherein the alloyed nanophene is a single-walled nanotube, a multi-walled nanotube, a nanohorn, or a fullerene.

3. The alloyed nanophene of claim 1 further comprising a dopant material.

4. The alloyed nanophene of claim 3, wherein the dopant material is selected from a group consisting of carbon, nitrogen, aluminum, silicon, phosphorus, beryllium, oxygen, lithium, sodium, potassium, rubidium, cesium, francium, osmium tetroxide, and mixtures thereof.

* * * * *